(12) United States Patent
Kapoor et al.

(10) Patent No.: US 8,825,054 B2
(45) Date of Patent: Sep. 2, 2014

(54) APPARATUS AND METHODS FOR PERFORMING HANDOVER OF USER EQUIPMENT BETWEEN DIFFERENT RADIO ACCESS NETWORKS

(71) Applicant: QUALCOMM Incorporated, San Diego, CA (US)

(72) Inventors: Rohit Kapoor, San Diego, CA (US); Bibhu Prasad Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/705,851

(22) Filed: Dec. 5, 2012

(65) Prior Publication Data
US 2013/0143569 A1 Jun. 6, 2013

Related U.S. Application Data

(60) Provisional application No. 61/567,549, filed on Dec. 6, 2011.

(51) Int. Cl.
*H04W 36/00* (2009.01)
*H04W 36/14* (2009.01)
*H04W 36/24* (2009.01)

(52) U.S. Cl.
CPC .............. *H04W 36/14* (2013.01); *H04W 36/24* (2013.01); *H04W 36/0066* (2013.01)
USPC ............................. 455/436; 455/437; 455/442

(58) Field of Classification Search
CPC . H04W 36/00; H04W 36/0005; H04W 36/04; H04W 28/02; H04W 28/16
USPC .............. 455/434, 435.1, 436, 437, 438, 439, 455/442
See application file for complete search history.

(56) References Cited

U.S. PATENT DOCUMENTS

| 2004/0255331 | A1 | 12/2004 | Inoue et al. |
| 2008/0049675 | A1 | 2/2008 | Burgan et al. |
| 2008/0159232 | A1 | 7/2008 | Thalanany et al. |
| 2009/0129296 | A1 | 5/2009 | Grinshpun et al. |
| 2009/0279507 | A1 | 11/2009 | Kanazawa et al. |
| 2010/0272067 | A1 | 10/2010 | Lu et al. |
| 2011/0007713 | A1* | 1/2011 | Kobayashi .................... 370/332 |
| 2011/0131654 | A1* | 6/2011 | Taneja et al. .................... 726/23 |
| 2012/0120960 | A1* | 5/2012 | Nishioka ....................... 370/392 |
| 2012/0311102 | A1* | 12/2012 | Stenfelt ......................... 709/219 |

FOREIGN PATENT DOCUMENTS

| WO | 2010088956 A1 | 8/2010 |
| WO | 2010100315 A1 | 9/2010 |

OTHER PUBLICATIONS

International Search Report and Written Opinion—PCT/US2012/068306—ISA/EPO—Mar. 27, 2013.

\* cited by examiner

*Primary Examiner* — Jean Gelin

(57) ABSTRACT

Aspects of the present disclosure are directed to a user equipment, an RNC, or an application operable in a wireless communications network and methods. A network controller for wireless communication is configured to transfer data via a first user plane connection in a first radio access network and initiate a handover procedure of transferring the user equipment to a second user plane connection in a second radio access network.

34 Claims, 12 Drawing Sheets

APPARATUS AND METHODS FOR PERFORMING HANDOVER OF USER EQUIPMENT BETWEEN DIFFERENT RADIO ACCESS NETWORKS

CROSS-REFERENCE TO RELATED APPLICATIONS

This application claims priority to and the benefit of provisional patent application no. 61/567,549, entitled IMPROVING PERFORMANCE OF DATA APPLICATIONS WHEN UE IS MOVED FROM HSPA TO LTE, filed in the United States patent office on Dec. 6, 2011, the entire content of which is incorporated herein by reference.

TECHNICAL FIELD

Aspects of the present disclosure relate generally to wireless communication systems, and more particularly, to handover of a user equipment between different radio access networks.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the wireless communication technologies not only to meet the growing demand for mobile broadband access, but to advance and enhance the user experience with mobile communications. An example of an emerging telecommunication standard is the evolved UTRAN (eUTRAN), also sometimes referred to as Long Term Evolution (LTE). LTE is a set of enhancements to the UMTS mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. Therefore, it is desirable that a user equipment is operable in multiple radio access networks, for example, the UTRAN as well as the eUTRAN.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are directed to a user equipment (UE), a radio network controller (RNC), or a remote server operable in a wireless communications network and methods in which packet drops may be avoided or reduced during the handover of the UE from one radio access technology (RAT) to another RAT (hereafter Inter-RAT handover).

In one aspect, the disclosure provides a method of wireless communication. The method includes transferring data at a network controller (e.g., an RNC or an eNode B) for a user equipment via a first user plane connection in a first radio access network; and if the data transferred via the first user plane connection satisfies a trigger condition, initiating a handover procedure of transferring the user equipment to a second user plane connection in a second radio access network.

Another aspect of the disclosure provides an apparatus for wireless communication. The apparatus includes means for transferring data at a network controller for a user equipment via a first user plane connection in a first radio access network; and if the data transferred via the first user plane connection satisfies a trigger condition, means for initiating a handover procedure of transferring the user equipment to a second user plane connection in a second radio access network.

Another aspect of the disclosure provides a computer-readable storage medium including code for causing a network controller to: transfer data for a user equipment via a first user plane connection in a first radio access network; and if the data transferred via the first user plane connection satisfies a trigger condition, initiate a handover procedure of transferring the user equipment to a second user plane connection in a second radio access network.

Another aspect of the disclosure provides an apparatus for wireless communication. The apparatus includes at least one processor; and a memory coupled to the at least one processor. The at least one processor is configured to: transfer data for a user equipment via a first user plane connection in a first radio access network; and if the data transferred via the first user plane connection satisfies a trigger condition, initiate a handover procedure of transferring the user equipment to a second user plane connection in a second radio access network.

Another aspect of the disclosure provides a method of wireless communication. The method includes transferring data at a network controller for a user equipment via a first user plane connection in a first radio access network, and initiating a handover procedure of transferring the user equipment to a second user plane connection in a second radio access network. In this aspect, the handover procedure includes relaying a request from the user equipment to a remote server in data communication with the user equipment, to stop sending data to the user equipment via the first user plane connection.

Another aspect of the disclosure provides a method of wireless communication. The method includes transferring data at a network controller for a user equipment via a first user plane connection in a first radio access network, and initiating a handover procedure of transferring the user equipment to a second user plane connection in a second radio access network. In this aspect, the handover procedure includes: initiating the second user plane connection between the user equipment and a remote server via the second radio access network; and transmitting a request to the remote server to restart transmission of the data via the second user plane connection, starting with a packet following in sequence after a last packet received by the user equipment via the first user plane connection.

Another aspect of the disclosure provides a method of wireless communication. The method includes transferring data at a network controller for a user equipment via a first user plane connection in a first radio access network, and initiating a handover procedure of transferring the user equipment to a second user plane connection in a second radio access network. In this aspect, the handover procedure includes initiating the second user plane connection for the user equipment in the second radio access network prior to transmitting a handover command to the user equipment, and transmitting the handover command to the user equipment to release the first user plane connection.

Another aspect of the disclosure provides an apparatus for wireless communication. The apparatus includes means for transferring data for a user equipment via a first user plane connection in a first radio access network, and means for initiating a handover procedure of transferring the user equipment to a second user plane connection in a second radio access network. In this aspect, the means for initiating the handover procedure includes means for relaying a request from the user equipment to a remote server in data communication with the user equipment, to stop sending data to the user equipment via the first user plane connection.

Another aspect of the disclosure provides an apparatus for wireless communication. The apparatus includes means for transferring data for a user equipment via a first user plane connection in a first radio access network, and means for initiating a handover procedure of transferring the user equipment to a second user plane connection in a second radio access network. In this aspect, the means for initiating the handover procedure includes: means for initiating the second user plane connection between the user equipment and a remote server via the second radio access network; and means for transmitting a request to the remote server to restart transmission of the data via the second user plane connection, starting with a packet following in sequence after a last packet received by the user equipment via the first user plane connection.

Another aspect of the disclosure provides an apparatus for wireless communication. The apparatus includes means for transferring data for a user equipment via a first user plane connection in a first radio access network, and means for initiating a handover procedure of transferring the user equipment to a second user plane connection in a second radio access network. In this aspect, the means for initiating the handover procedure includes means for initiating the second user plane connection for the user equipment in the second radio access network prior to transmitting a handover command to the user equipment, and means for transmitting the handover command to the user equipment to release the first user plane connection.

Another aspect of the disclosure provides a computer-readable storage medium. The computer-readable storage medium includes code for causing a network controller to: transfer data for a user equipment via a first user plane connection in a first radio access network; and initiate a handover procedure of transferring the user equipment to a second user plane connection in a second radio access network. In this aspect, in the handover procedure, the network controller is configured to relay a request from the user equipment to a remote server in data communication with the user equipment, to stop sending data to the user equipment via the first user plane connection.

Another aspect of the disclosure provides a computer-readable storage medium. The computer-readable storage medium includes code for causing a network controller to transfer data for a user equipment via a first user plane connection in a first radio access network, and initiate a handover procedure of transferring the user equipment to a second user plane connection in a second radio access network. In this aspect, in the handover procedure, the network controller is configured to: initiate the second user plane connection between the user equipment and a remote server via the second radio access network; and transmit a request to the remote server to restart transmission of the data via the second user plane connection, starting with a packet following in sequence after a last packet received by the user equipment via the first user plane connection.

Another aspect of the disclosure provides a computer-readable storage medium. The computer-readable storage medium includes code for causing a network controller to transfer data for a user equipment via a first user plane connection in a first radio access network, and initiate a handover procedure of transferring the user equipment to a second user plane connection in a second radio access network. In this aspect, in the handover procedure, the network controller is configured to initiate the second user plane connection for the user equipment in the second radio access network prior to transmitting a handover command to the user equipment, and transmit the handover command to the user equipment to release the first user plane connection.

Another aspect of the disclosure provides an apparatus for wireless communication. The apparatus includes at least one processor and a memory coupled to the at least one processor. The at least one processor is configured to transfer data for a user equipment via a first user plane connection in a first radio access network, and initiate a handover procedure of transferring the user equipment to a second user plane connection in a second radio access network. In the handover procedure, the at least one processor is configured to relay a request from the user equipment to a remote server in data communication with the user equipment, to stop sending data to the user equipment via the first user plane connection.

Another aspect of the disclosure provides an apparatus for wireless communication. The apparatus includes at least one processor and a memory coupled to the at least one processor. The at least one processor is configured to transfer data for a user equipment via a first user plane connection in a first radio access network, and initiate a handover procedure of transferring the user equipment to a second user plane connection in a second radio access network. In the handover procedure, the at least one processor is configured to: initiate the second user plane connection between the user equipment and a remote server via the second radio access network; and transmit a request to the remote server to restart transmission of the data via the second user plane connection, starting with a packet following in sequence after a last packet received by the user equipment via the first user plane connection.

Another aspect of the disclosure provides an apparatus for wireless communication. The apparatus includes at least one processor and a memory coupled to the at least one processor. The at least one processor is configured to transfer data for a user equipment via a first user plane connection in a first radio access network, and initiate a handover procedure of transferring the user equipment to a second user plane connection in a second radio access network. In the handover procedure, the at least one processor is configured to initiate the second user plane connection for the user equipment in the second radio access network prior to transmitting a handover command to the user equipment, and transmit the handover command to the user equipment to release the first user plane connection.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

According to various aspects of this disclosure, a user equipment (UE) may include hardware and/or software for supporting one or more radio access technologies (RATs). For example, a UE may include hardware and/or software for accessing UMTS/HSPA and Long Term Evolution (LTE) networks. However, when the UE moves between (i.e., handover) different RATs (e.g., from UMTS/HSPA to LTE) while user data is being transferred between the UE and a remote terminal or network entity, packets may be dropped at one of the network nodes such as a radio network controller (RNC). The dropped packets may impact the performance of packet-based applications and undesirably affect user experience. In various illustrative examples described herein, UE based and/or network based techniques are utilized to improve handover performance when the UE is moved from a UMTS/HSPA network to an LTE network. However, the described techniques may also be applicable to other types of Inter-RAT handovers (e.g., WiMAX to LTE, EV-DO to HSPA, EV-DO to HSPA, LTE to HSPA, etc.)

According to various aspects of this disclosure, Inter-RAT handover (e.g., HSPA to LTE) may be triggered by various events or conditions such as, for example, based on data transferred (e.g., data volume triggers in a period of time). In addition to data volume triggers, other types of triggers may be used. For example, Inter-RAT handover may be triggered if one of the network's coverage/quality is better than a certain threshold. However, it should be noted that other examples for triggering Inter-RAT handover in other implementations may be used.

According to various aspects of this disclosure, potential enhancements to Inter-RAT handover include avoiding packet drops or recovering quickly after packet drops through an implementation specific UE based approach and/or a change of mobility approach. These enhancements will be described in more detail infra. The various concepts presented throughout this disclosure may be implemented across a broad variety of telecommunication systems, network architectures, and communication standards.

Figure 1:
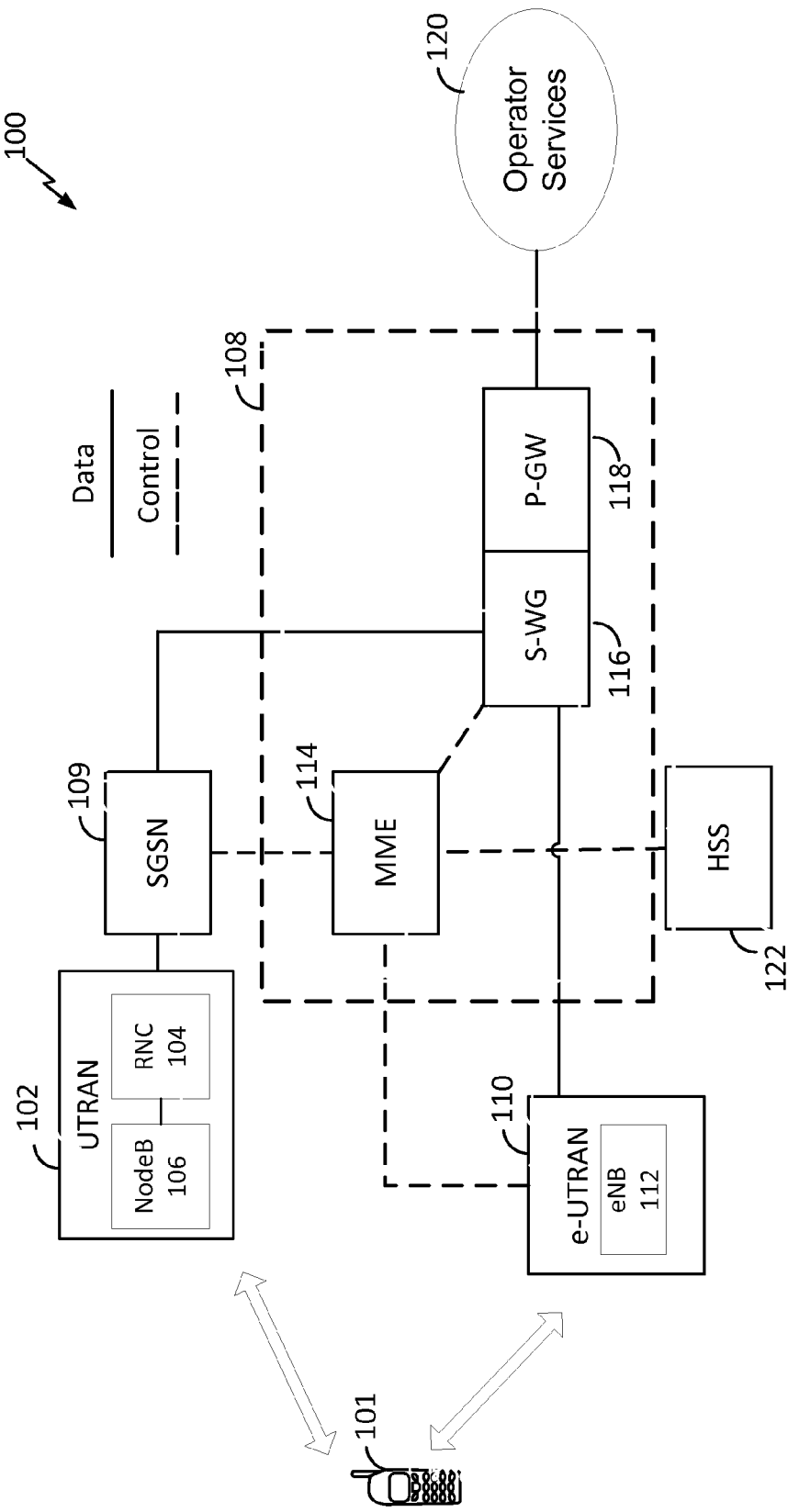
FIG. 1 is a block diagram conceptually illustrating an example of a telecommunications system.

FIG. 1 is a block diagram conceptually illustrating a telecommunications system 100 including a UTRAN and an eUTRAN according to an example of the disclosure. Referring now to FIG. 1, the telecommunications system 100 may include both UMTS/HSPA and long term evolution (LTE) network access to a user equipment (UE) 101. In one example, the telecommunications system 100 has an evolved packet core (EPC), a UTRAN 102, and an eUTRAN 110. Among several options available for the UTRAN 102, in this example, the illustrated UTRAN 102 may employ a WCDMA air interface for enabling various wireless services including telephony, video, data, messaging, broadcasts, and/or other services. The UTRAN 102 may include a plurality of Radio Network Subsystems (RNSs), each controlled by a respective Radio Network Controller (RNC) such as an RNC 104. For reasons of clarity, only the RNC 104 is shown in FIG. 1. The RNC 104 is an apparatus responsible for, among other things, assigning, reconfiguring, and releasing radio resources within an RNS. The RNC 104 may be interconnected to other RNCs (not shown) in the UTRAN 102 through various types of interfaces such as a direct physical connection, a virtual network, or the like using any suitable transport network.

The geographic region covered by the RNS may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, one Node B 106 is shown in the UTRAN 102; however, each RNS may include any number of wireless Node Bs. The Node B 106 provides wireless access points to a core network for any number of mobile apparatuses (e.g., UE 101). Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS and LTE applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. The UE 101 may further include a universal subscriber identity module (USIM) (not shown), which contains a user's subscription information to a network. For illustrative purposes, one UE 101 is shown in communication with the Node B 106. The downlink (DL), also called the forward link, refers to the communication link from the Node B 106 to the UE 101, and the uplink (UL), also called the reverse link, refers to the communication link from the UE 101 to the Node B 106.

The telecommunications system 100 may include a serving GPRS support node (SGSN) 109 to provide packet-data services. The SGSN 109 provides a packet-based connection for the UTRAN 102 to the EPC 108.

As shown, an evolved packet core (EPC) 108 can interface with one or more radio access networks, such as the UTRAN 102 and an evolved UTRAN (eUTRAN) 110. However, as those skilled in the art will recognize, the various concepts presented throughout this disclosure may be implemented in other suitable radio access networks, to provide UEs with access to types of core networks other than UMTS and LTE networks. The eUTRAN 110 may include an eNode B (eNB) 112 and other eNBs (not shown). The eNB 112 provides user and control plane protocol terminations toward the UE 101. The eNB 112 may be connected to the other eNBs via an X2 interface (i.e., backhaul). The eNB 112 may also be referred to by those skilled in the art as a base station, a base transceiver station, a radio base station, a radio transceiver, a transceiver function, a basic service set (BSS), an extended service set (ESS), or some other suitable terminology. The eNB 112 provides an access point to the EPC 108 for the UE 101.

The EPC 108 includes a Mobility Management Entity (MME) 114, other MMEs (not shown), a Serving Gateway (S-WG) 116, and a Packet Data Network (PDN) Gateway (P-GW) 118. The MME 114 is the control node that processes the signaling between the UE 101 and the EPC 108. Generally, the MME 114 provides bearer and connection management. All user IP packets are transferred through the P-GW 116, which itself is connected to the P-GW 118. The P-GW 118 provides UE IP address allocation as well as other functions. The P-GW 118 is connected to Operator's IP Services 120. The Operator's IP Services may be provided by one or more remote servers. The terms Operator's IP Services and remote server(s) may be used interchangeably herein. The Operator's IP Services 120 may include the Internet, the Intranet, an IP Multimedia Subsystem (IMS), and a PS Streaming Service (PSS). In one example, the IP Services 120 include a TCP server. The telecommunications network 100 may include a Home Subscriber Server (HSS) 122 that presents the registers, covering functionalities such as the Home Location Register (HLR) and contains, for example, user-specific information on service priorities, data rates, etc. The S-GW 116 and P-GW 118 handle tasks related to the mobility management inside the eUTRAN 110, as well as the UTRAN 102. As shown in FIG. 1, the SGSN 109 is operatively connected to the gateways 116 and 118, thus handling the Gateway GPRS Support Node (GGSN) functionalities of the UTRAN network.

Figure 2:
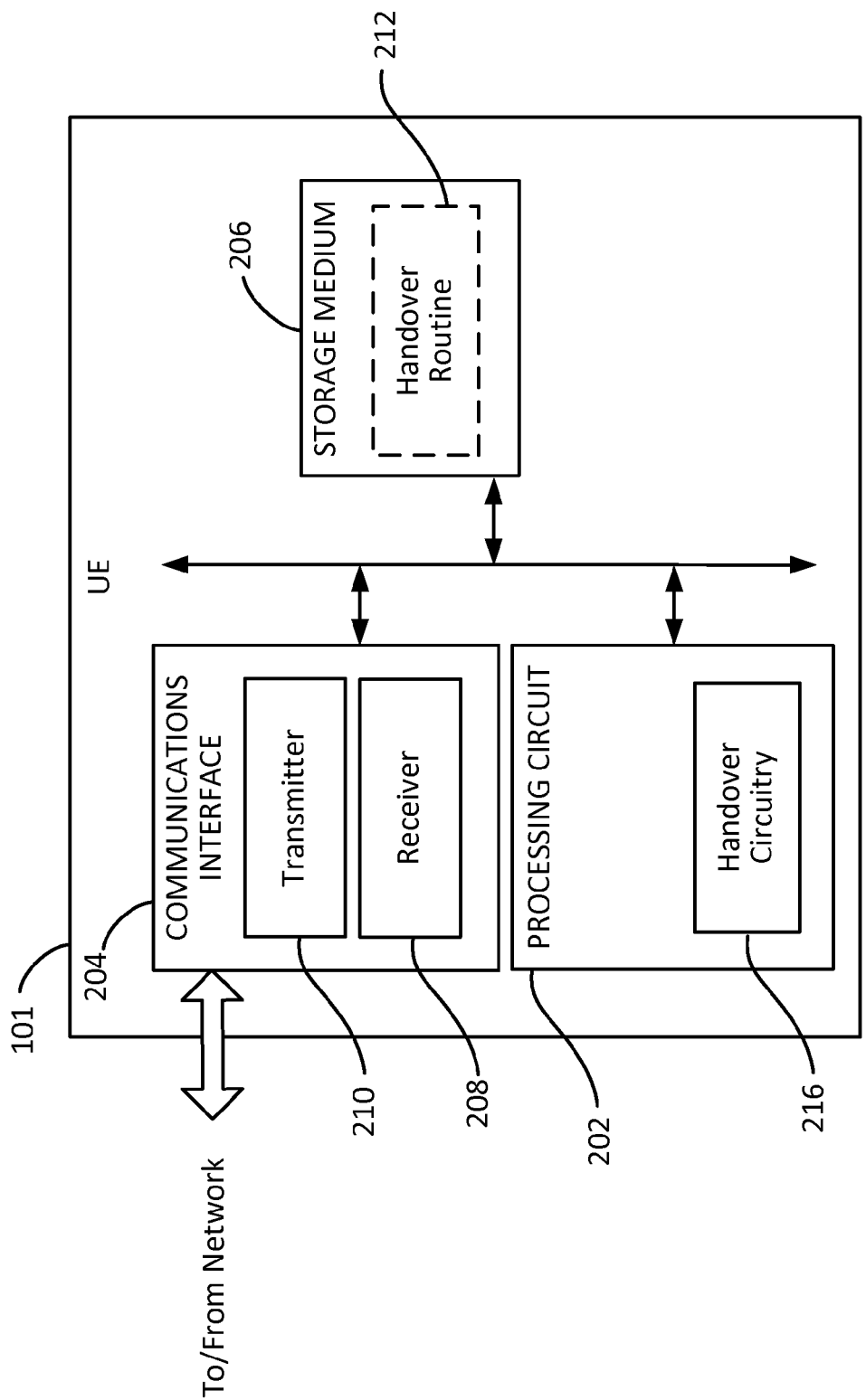
FIG. 2 is a conceptual diagram illustrating an example of a hardware implementation for a user equipment (UE) employing a processing system.

FIG. 2 is a conceptual diagram illustrating a hardware implementation for the UE 101 according to an example of the disclosure. Components of the UE 101 generally known in the art are not shown for reasons of clarity and comprehensibility. As shown in FIG. 2, the UE 101 generally includes a processing circuit 202 coupled to or placed in electrical communication with a communications interface 204 and a storage medium 206.

The processing circuit 202 is arranged to obtain, process and/or send data, control data access and storage, issue commands, and control other desired operations. The processing circuit 202 may include circuitry adapted to implement desired programming provided by appropriate media in at least one example. For example, the processing circuit 202 may be implemented as one or more processors, one or more controllers, and/or other structures configured to execute executable programming Examples of the processing circuit 202 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 202 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 202 are for illustration and other suitable configurations within the scope of the present disclosure are also contemplated.

The processing circuit 202 is adapted for processing, including the execution of programming, which may be stored on the storage medium 206. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 204 is configured to facilitate wireless communications of the UE 101. For example, the communications interface 204 may include circuitry and/or programming adapted to facilitate the communication of information bi-directionally with respect to one or more network nodes. The communications interface 204 may be coupled to one or more antennas (not shown), and includes wireless transceiver circuitry, including at least one receiver circuit 208 (e.g., one or more receiver chains) and/or at least one transmitter circuit 210 (e.g., one or more transmitter chains).

The storage medium 206 may represent one or more computer-readable, machine-readable, and/or processor-readable devices for storing programming, such as processor executable code or instructions (e.g., software, firmware), electronic data, databases, or other digital information. The storage medium 206 may also be used for storing data that is manipulated by the processing circuit 202 when executing programming. The storage medium 206 may be any available media that can be accessed by a general purpose or special purpose processor, including portable or fixed storage devices, optical storage devices, and various other mediums capable of storing, containing and/or carrying programming By way of example and not limitation, the storage medium 206 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 206 may be coupled to the processing circuit 202 such that the processing circuit 202 can read information from, and write information to, the storage medium 206. That is, the storage medium 206 can be coupled to the processing circuit 202 so that the storage medium 206 is at least accessible by the processing circuit 202, including examples where the storage medium 206 is integral to the processing circuit 202 and/or examples where the storage medium 206 is separate from the processing circuit 202 (e.g., resident in the UE 101, external to the UE 101, and/or distributed across multiple entities).

Programming stored by the storage medium 206, when executed by the processing circuit 202, causes the processing circuit 202 to perform one or more of the various functions and/or process steps described herein. For example, the storage medium 206 may include a handover routine 212 that may be executed by the processing circuit 202 (e.g., a handover circuitry 216) to handle Inter-RAT handovers. Thus, according to one or more aspects of the present disclosure, the processing circuit 202 is adapted to perform (in conjunction with the storage medium 206) any or all of the processes, functions, steps and/or routines for any or all of the UEs described herein (e.g., UE 101). As used herein, the term "adapted" in relation to the processing circuit 202 may refer to the processing circuit 202 being one or more of configured, employed, implemented, and/or programmed to perform a particular process, function, step and/or routine according to various features described herein.

Figure 3:
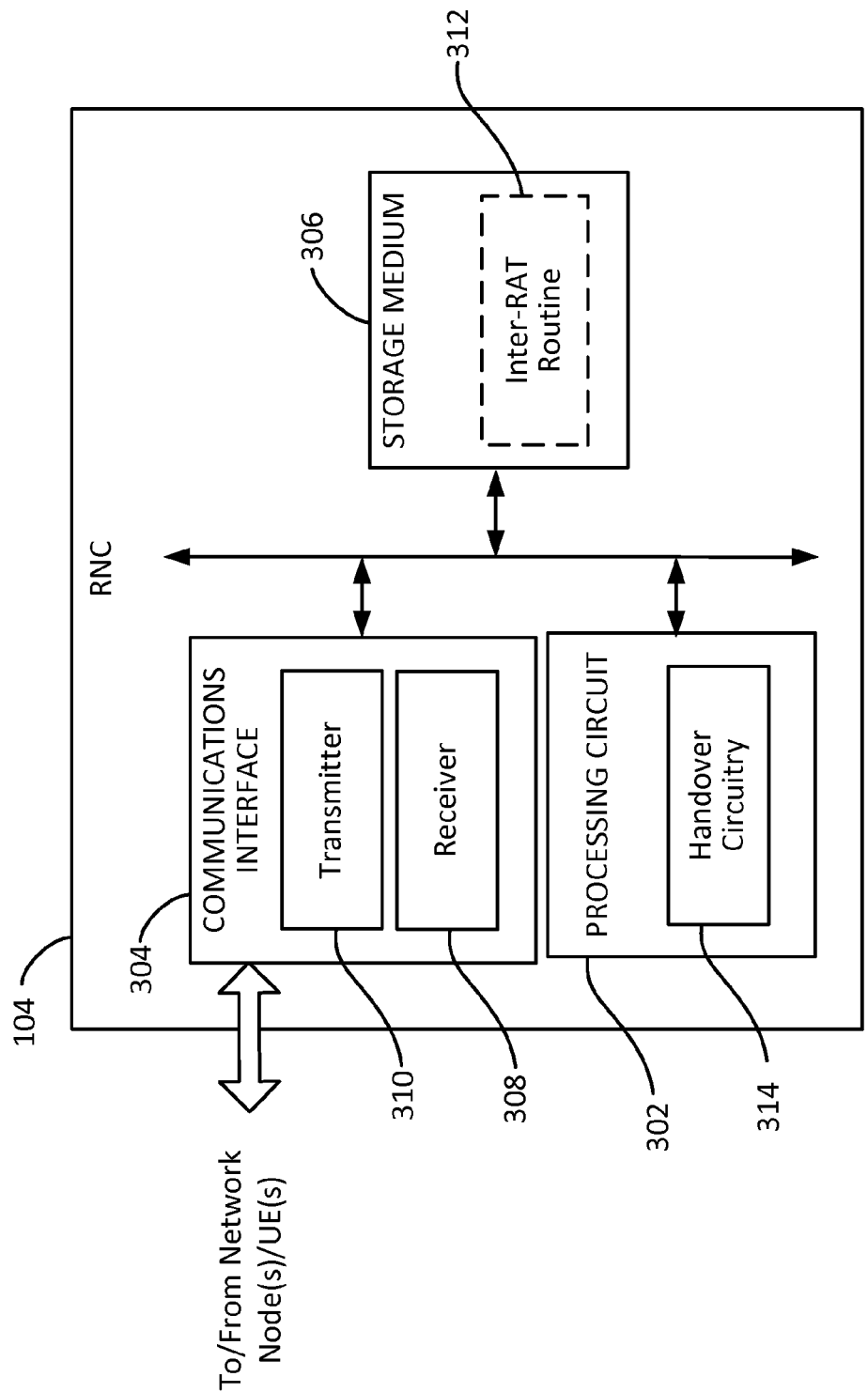
FIG. 3 is a conceptual diagram illustrating an example of a hardware implementation for an RNC employing a processing system.

FIG. 3 is a conceptual diagram illustrating a hardware implementation of the RNC 104 according to an example of the disclosure. Components of the RNC 104 generally known in the art are not shown for reasons of clarity and comprehensibility. As shown, the RNC 104 includes a processing circuit 302 coupled to or placed in electrical communication with a communications interface 304 and to a storage medium 306. The processing circuit 302 is arranged to obtain, process and/or send data, control data access and storage, issue commands, and control other desired operations. The processing circuit 302 may include circuitry adapted for processing, including the execution and implementation of programming provided by appropriate media, including media stored on the storage medium 306 in at least one example. Examples and implementations for the processing circuit 302 may include any of the various examples and implementations of the processing circuit 202 described above with reference to FIG. 2. The examples of the processing circuit 302 including those set forth with reference to the processing circuit 202 in FIG. 2 are for illustration, and other suitable configurations within the scope of the present disclosure are also contemplated.

The communications interface 304 is configured to facilitate wired and/or wireless communications of the RNC 104. For example, the communications interface 304 may include circuitry and/or programming adapted to facilitate the communication of information bi-directionally with respect to one or more UEs, as well as one or more other network nodes. The communications interface 304 may be coupled to one or more antennas (not shown), and includes wireless transceiver circuitry, including at least one receiver circuit 308 (e.g., one or more receiver chains) and/or at least one transmitter circuit 310 (e.g., one or more transmitter chains).

The storage medium 306 may represent one or more computer-readable, machine-readable, and/or processor-readable devices for storing programming, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor, including portable or fixed storage devices, optical storage devices, and various other mediums capable of storing, containing and/or carrying programming. Examples of the storage medium 306 may include any of the examples included in the description of the storage medium 206 set forth above with reference to FIG. 2.

The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, including examples where the storage medium 306 is integral to the processing circuit 302 and/or examples where the storage medium 306 is separate from the processing circuit 302 (e.g., resident in the RNC 104, external to the RNC 104, and/or distributed across multiple entities).

Programming stored by the storage medium 306, when executed by the processing circuit 302, causes the processing circuit 302 to perform one or more of the various functions and/or process steps described herein. For example, the storage medium 306 may include an Inter-RAT routine 312, and the processing circuit 102 may include a handover circuitry 314 that is adapted to perform various functions in accordance with the Inter-RAT routine 312. The various functions of the Inter-RAT routine 312 will be described in more detail infra. Thus, according to one or more aspects of the present disclosure, the processing circuit 302 is adapted to perform (in conjunction with the storage medium 306) any or all of the processes, functions, steps and/or routines for any or all of the RNC 104 described herein. As used herein, the term "adapted" in relation to the processing circuit 302 may refer to the processing circuit 302 being one or more of configured, employed, implemented, and/or programmed to perform a particular process, function, step and/or routine according to various features described herein.

Figure 4:
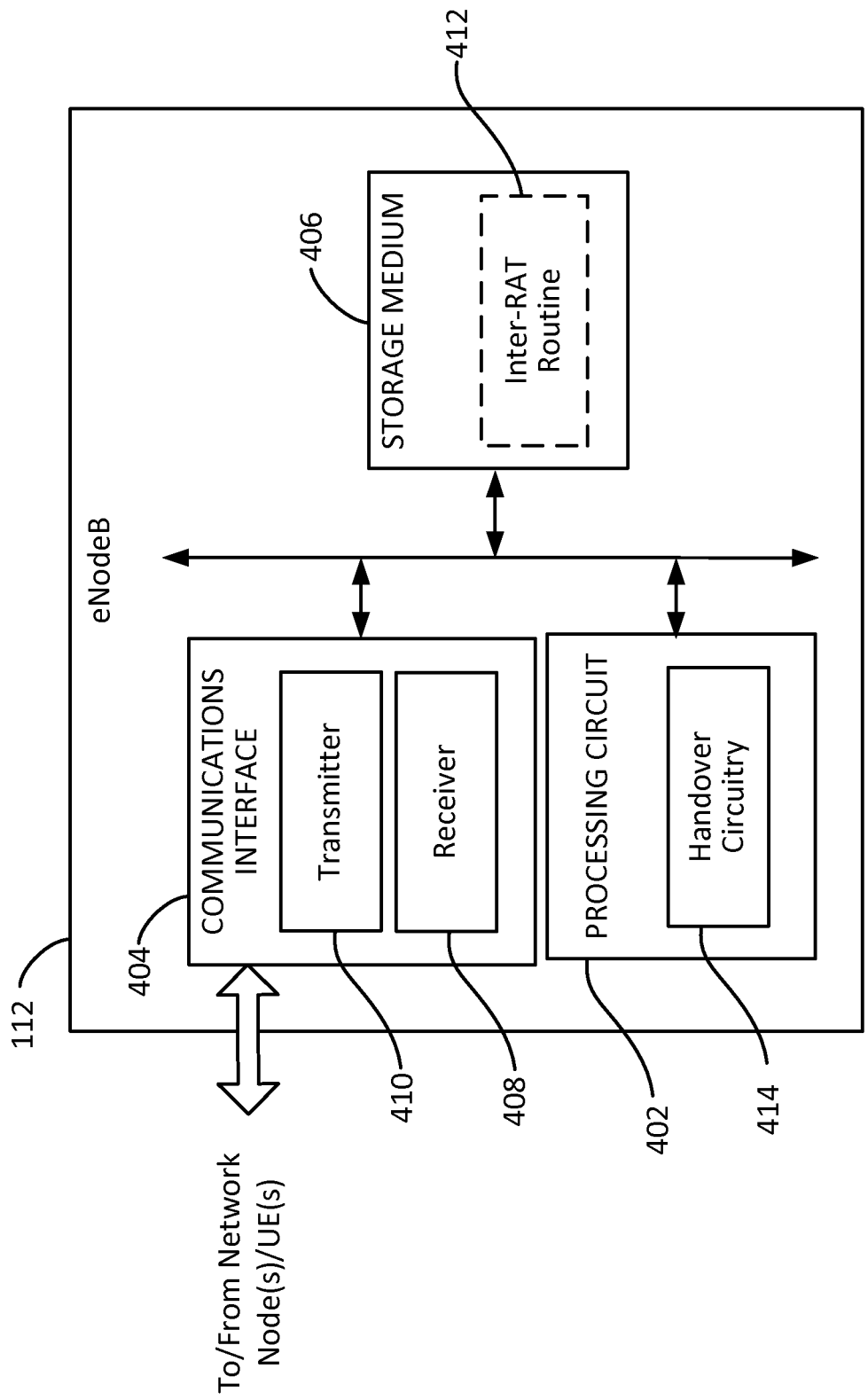
FIG. 4 is a conceptual diagram illustrating an example of a hardware implementation for an eNode B (eNB) employing a processing system.

FIG. 4 is a conceptual diagram illustrating a hardware implementation of the eNB 112 according to an example of the disclosure. Components of the eNB 112 generally known in the art are not shown for reasons of clarity and comprehensibility. As shown, the eNB 112 includes a processing circuit 402 coupled to or placed in electrical communication with a communications interface 404 and to a storage medium 406. The processing circuit 402 is arranged to obtain, process and/or send data, control data access and storage, issue commands, and control other desired operations. The processing circuit 402 may include circuitry adapted for processing, including the execution and implementation of programming provided by appropriate media, including media stored on the storage medium 406 in at least one example. Examples and implementations for the processing circuit 402 may include any of the various examples and implementations of the processing circuit 202 described above with reference to FIG. 2. The examples of the processing circuit 402 including those set forth with reference to the processing circuit 202 in FIG. 2 are for illustration, and other suitable configurations within the scope of the present disclosure are also contemplated.

The communications interface 404 is configured to facilitate wired and/or wireless communications of the eNB 112. For example, the communications interface 404 may include circuitry and/or programming adapted to facilitate the communication of information bi-directionally with respect to one or more UEs, as well as one or more other network nodes. The communications interface 404 may be coupled to one or more antennas (not shown), and includes wireless transceiver circuitry, including at least one receiver circuit 408 (e.g., one or more receiver chains) and/or at least one transmitter circuit 410 (e.g., one or more transmitter chains).

The storage medium 406 may represent one or more computer-readable, machine-readable, and/or processor-readable devices for storing programming, such as processor executable code or instructions (e.g., software, firmware), electronic data, databases, or other digital information. The storage medium 406 may also be used for storing data that is manipulated by the processing circuit 402 when executing programming. The storage medium 406 may be any available media that can be accessed by a general purpose or special purpose processor, including portable or fixed storage devices, optical storage devices, and various other mediums capable of storing, containing and/or carrying programming. Examples of the storage medium 406 may include any of the examples included in the description of the storage medium 206 set forth above with reference to FIG. 2.

The storage medium 406 may be coupled to the processing circuit 402 such that the processing circuit 402 can read information from, and write information to, the storage medium 406. That is, the storage medium 406 can be coupled to the processing circuit 402 so that the storage medium 406 is at least accessible by the processing circuit 402, including examples where the storage medium 406 is integral to the processing circuit 402 and/or examples where the storage medium 406 is separate from the processing circuit 402 (e.g., resident in the eNB 112, external to the eNB 112, and/or distributed across multiple entities).

Programming stored by the storage medium 406, when executed by the processing circuit 402, causes the processing circuit 402 to perform one or more of the various functions and/or process steps described herein. For example, the storage medium 406 may include an Inter-RAT routine 412, and the processing circuit 402 may include a handover circuitry 414 that is adapted to perform various functions in accordance with the Inter-RAT routine 412. The various functions of the Inter-RAT routine 412 will be described in more detail infra. Thus, according to one or more aspects of the present disclosure, the processing circuit 402 is adapted to perform (in conjunction with the storage medium 406) any or all of the processes, functions, steps and/or routines for any or all of the eNB 112 described herein. As used herein, the term "adapted" in relation to the processing circuit 402 may refer to the processing circuit 402 being one or more of configured, employed, implemented, and/or programmed to perform a particular process, function, step and/or routine according to various features described herein.

Figure 5:
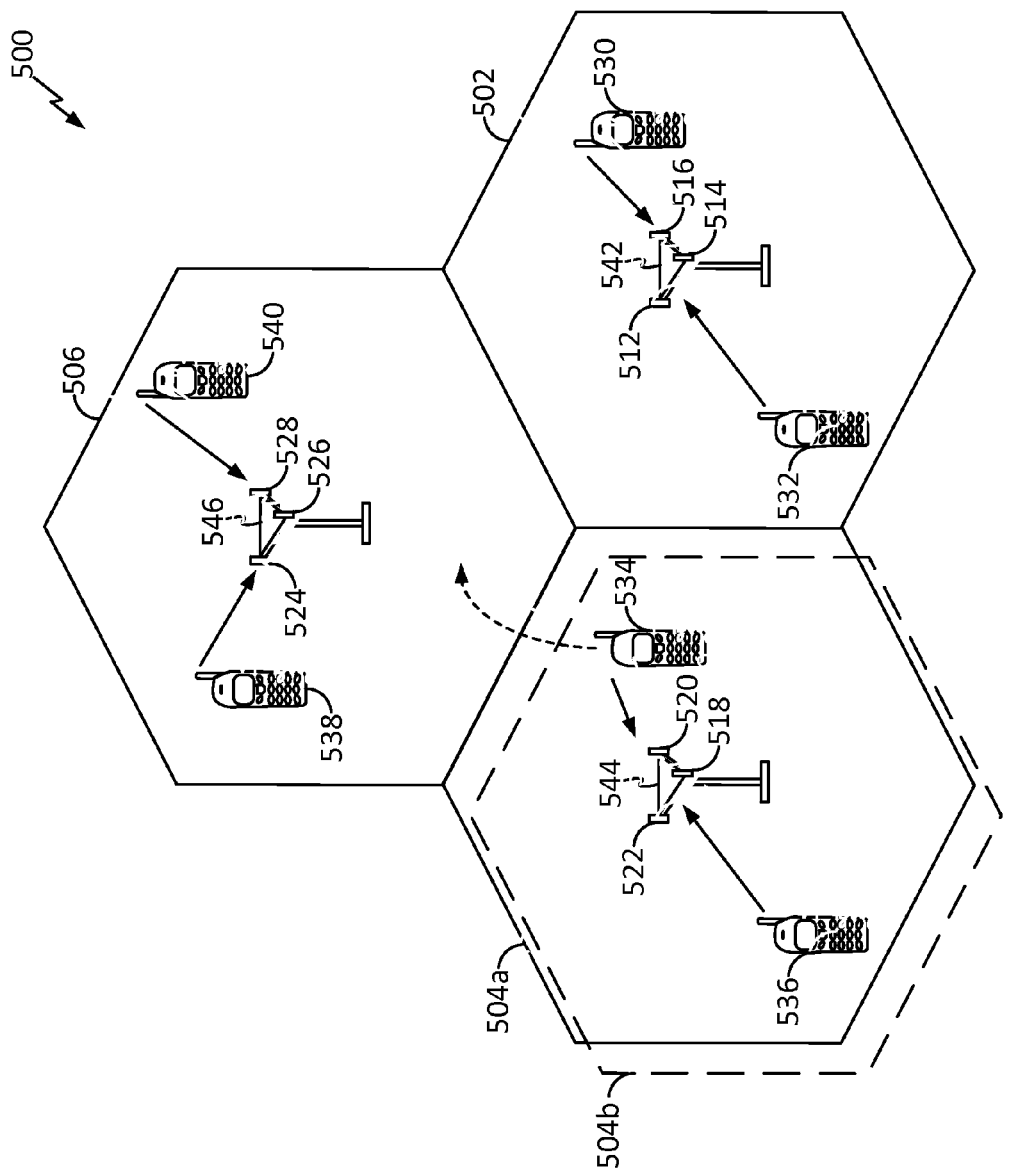
FIG. 5 is a drawing conceptually illustrating an example of a radio access network (RAN).

FIG. 5 is a drawing conceptually illustrating an example of a radio access network (RAN) 500 supporting multiple RATs (e.g., UTRAN and eUTRAN) that may be utilized in accordance with the present disclosure. The RAN 500 includes multiple cellular regions (cells), including cells 502, 504, and 506, each of which may include one or more sectors. Cells may be defined geographically (e.g., by coverage area) and/or may be defined in accordance with a frequency, scrambling code, etc. That is, the illustrated geographically-defined cells 502, 504, and 506 may each be further divided into a plurality of cells In a cell that is divided into sectors, the multiple sectors within a cell can be formed by groups of antennas with each antenna responsible for communication with UEs in a portion of the cell. For example, in cell 502, antenna groups 512,514, and 516 may each correspond to a different sector. In cell 504, antenna groups 518, 520, and 522 may each correspond to a different sector. In cell 506, antenna groups 524, 526, and 528 may each correspond to a different sector.

The cells 502, 504, and 506 may include several UEs that may be in communication with one or more sectors of each cell 502, 504, or 506. For example, UEs 530 and 532 may be in communication with Node B/eNB 542, UEs 534 and 536 may be in communication with Node B/eNB 544, and UEs 538 and 540 may be in communication with Node B/eNB 546. Here, each Node B/eNB 542, 544, and 546 may be configured to provide an access point to a EPC 108 (see FIG. 1) for all the UEs 530, 532, 534, 536, 538, and 540 in the respective cells 502, 504, and 506. In various examples, each of the Node B/eNB 542, 544, and 546 may include a Node B 106, an eNB 112, or both. In some examples, a Node B and an eNB of the same cell may be at the same location or different locations. That is, a coverage area of a Node B (e.g., 504$a$) and that of a corresponding eNB (e.g., 504$b$) may overlap each other, partially overlap each other, or do not overlap. Therefore, the RAN 500 may support multiple radio access networks such as the HSPA and LTE standards.

Recently, many existing networks have been upgraded to support both UMTS and LTE. Therefore, a UE 101 configured to support multiple RATs may move from one RAT to another RAT (Inter-RAT handover) in the middle of an ongoing communication. However, when the UE 101 moves from one RAT to another RAT, data packets may be dropped at one or more of the network nodes (e.g., RNC 104). This can impact certain applications such as TCP-based applications. Aspects of this disclosure describe UE-based and network-based techniques that may enhance performance of TCP and other data applications when the UE 101 is moved from one RAT to another RAT, by way of example, from HSPA to LTE In a wireless telecommunications system, the communication protocol architecture may take on various forms depending on the particular application. For example, in a 3GPP UMTS network, the signaling protocol stack is divided into a Non-Access Stratum (NAS) and an Access Stratum (AS). The NAS provides the upper layers, for signaling between the UE 101 and the core network, and may include circuit switched and packet switched protocols. The AS provides the lower layers, for signaling between the UTRAN/eUTRAN and the UE 101, and may include a user plane and a control plane. Here, the user plane (also referred to herein as the data plane) carries user traffic, while the control plane carries control information (i.e., signaling).

Figure 6:
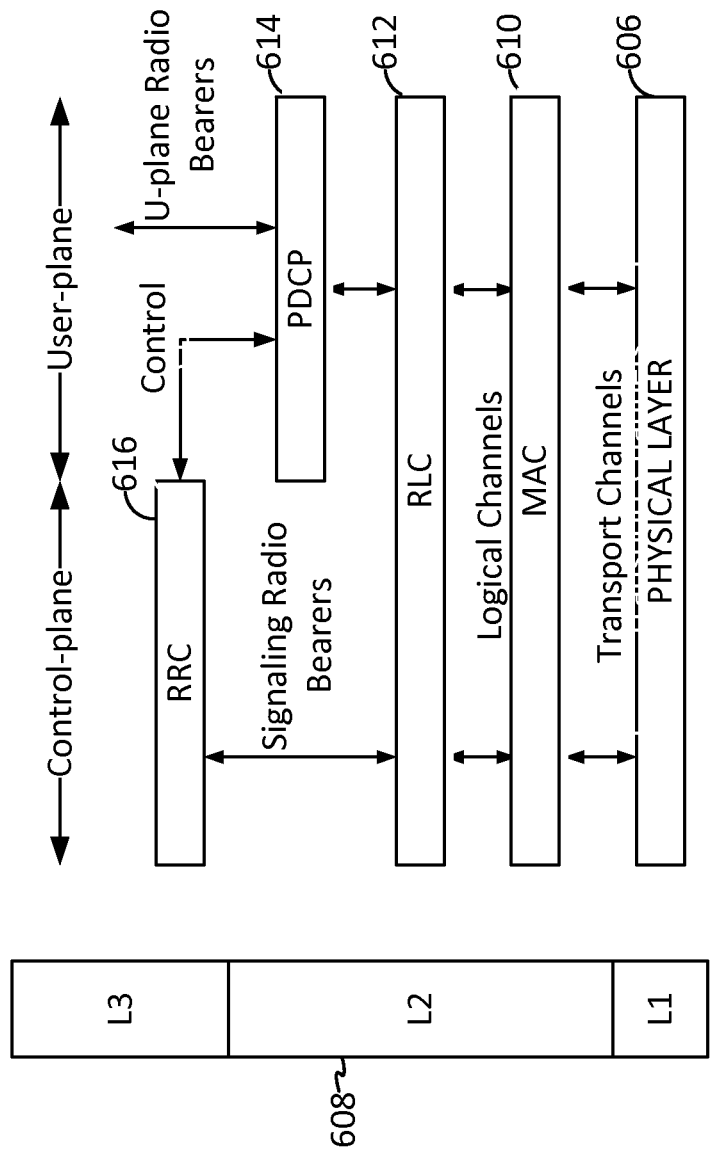
FIG. 6 is a diagram illustrating an example of a third generation (3G) radio protocol architecture.

FIG. 6 is a diagram illustrating an example of a radio protocol architecture operational in a UMTS network. Turning to FIG. 6, the AS is shown with three layers: Layer 1, Layer 2, and Layer 3. Layer 1 is the lowest layer and implements various physical layer signal processing functions.

Layer 1 will be referred to herein as the physical layer 606. The data link layer, called Layer 2 608, is above the physical layer 606 and is responsible for the link between the UE 101 and Node B 106 over the physical layer 606.

At Layer 3, the RRC layer 616 handles the control plane signaling between the UE 101 and the Node B 106. RRC layer 616 includes a number of functional entities for routing higher layer messages, handling broadcasting and paging functions, establishing and configuring radio bearers, etc.

In the illustrated air interface, the L2 layer 608 is split into sublayers. In the control plane, the L2 layer 608 includes two sublayers: a medium access control (MAC) sublayer 610 and a radio link control (RLC) sublayer 612. In the user plane, the L2 layer 608 additionally includes a packet data convergence protocol (PDCP) sublayer 614. Although not shown, the UE 101 may have several upper layers above the L2 layer 608 including a network layer (e.g., IP layer) that is terminated at a PDN gateway on the network side and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between Node Bs.

The RLC sublayer 612 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

Figure 7:
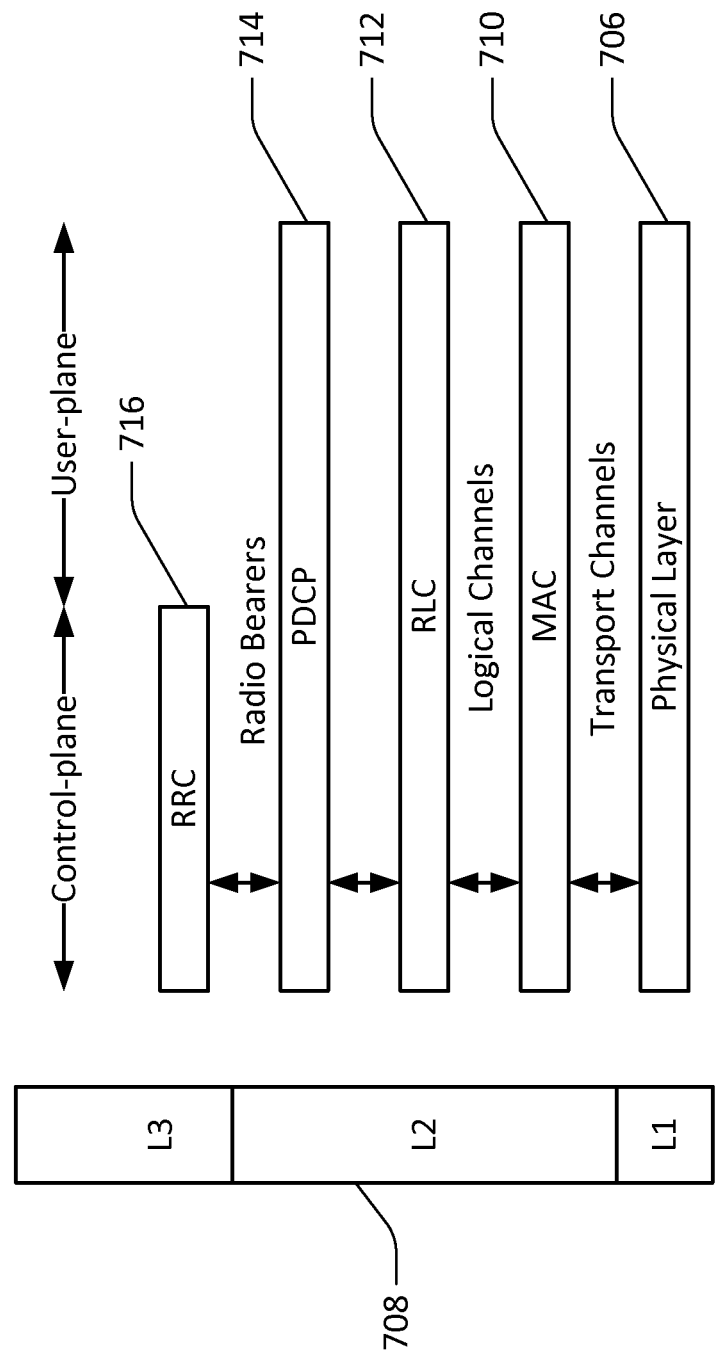
FIG. 7 is a diagram illustrating an example of a fourth generation (4G) radio protocol architecture.

FIG. 7 is a diagram illustrating an example of a radio protocol architecture operable in an LTE network. Turning to FIG. 7, the radio protocol architecture for communication between the UE 101 and the eNB 112 is shown with three layers: Layer 1, Layer 2, and Layer 3. Layer 1 is the lowest layer and implements various physical layer signal processing functions. Layer 1 will be referred to herein as the physical layer 706. Layer 2 (L2 layer) 708 is above the physical layer 706 and is responsible for the link between the UE 101 and eNB 112 over the physical layer 706. In the user plane, the L2 layer 708 includes a media access control (MAC) sublayer 710, a radio link control (RLC) sublayer 712, and a packet data convergence protocol (PDCP) 714 sublayer, which are terminated at the eNB 112 on the network side. Although not shown, the UE 101 may have several upper layers above the L2 layer 708 including a network layer (e.g., IP layer) that is terminated at the P-GW 118 (see FIG. 1) on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between eNBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

In the control plane, the radio protocol architecture for the UE 101 and eNB 112 is substantially the same for the physical layer 706 and the L2 layer 708 with the exception that there is no header compression function for the control plane. The control plane also includes a radio resource control (RRC) sublayer 716 in Layer 3. The RRC sublayer 716 is responsible for obtaining radio resources (i.e., radio bearers) and for configuring the lower layers using RRC signaling between the eNB and the UE.

Hereinafter, various aspects of the disclosure are described in the following nonlimiting examples in which the UE 101 may include hardware and/or software for supporting multiple RATs. By way of example, and not limited thereto, the UE 101 may include hardware and/or software for supporting both HSPA and LTE standards. When the UE 101 moves from HSPA to LTE, packets may be dropped at one of the network nodes (e.g., the RNC 104). Therefore, according to aspects of the present disclosure, UE based and network based techniques are used to enhance the performance of data application (e.g., TCP applications) when the UE 101 is moved from HSPA to LTE. The below described techniques may also be applicable to other types of Inter-RAT handovers (e.g., WiMAX to LTE, EV-DO to HSPA, EV-DO to HSPA, LTE to HSPA, etc.)

Figure 8:
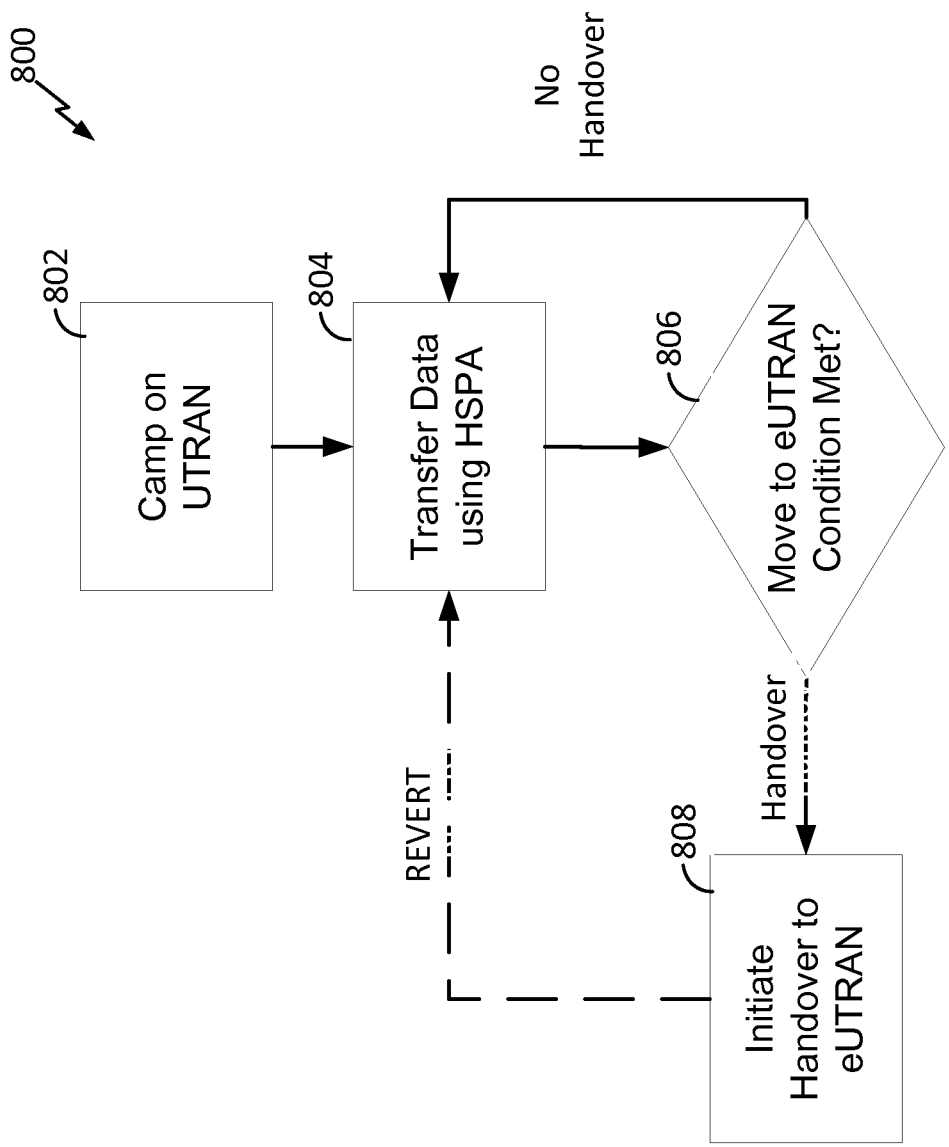
FIG. 8 is a flowchart illustrating a technique for handling Inter-RAT handover between a UTRAN and an eUTRAN according to an example of the disclosure.

In one aspect of the disclosure, Inter-RAT handover (e.g., HSPA to LTE) may be triggered by various events, such as, for example, based on data volume triggers. FIG. 8 is a flowchart illustrating a process 800 for handling an Inter-RAT handover from HSPA to LTE. According to some aspects of the disclosure, by way of example only, a UE 101 including a handover routine 212, an RNC 104 including an Inter-RAT routine 312, and an eNobeB 112 including an Inter-RAT routine 412 may be operated to perform the procedures described in FIG. 8.

Referring to the process 800, at step 802, the UE 101 is initially camped on a UTRAN 102. At step 804, the UE 101 is transferring data using HSPA (e.g., downloading data from a remote server or an application server). For example, the UE 101 may be downloading a file from a remote server or an application server using a TCP connection via HSPA. At step 806, if a certain handover or trigger condition is met, the UE 101 is moved from the UTRAN 102 to an eUTRAN 110. In one aspect, the Inter-RAT routine 312 of the RNC 104 may include suitable functions for monitoring the handover condition. For example, if the UE 101 is downloading a volume of data exceeding a threshold (e.g., a predetermined threshold) within a period of time, and the UE 101 is camped on the UTRAN, an Inter-RAT handover may be triggered to move the UE 101 from the UTRAN to the eUTRAN at step 808.

In one aspect, the Inter-RAT routine 312 may include suitable functions for sending a command to the UE 101 to commence handover to the eNodeB 112. Upon the reception of the command, the UE 101 according to the handover routine 212 suspends transmission of user plane data and moves to the eUTRAN 110 and performs suitable access procedures toward the target eNodeB 112. When the UE 101 has gotten access to the eNodeB 112, the handover routine 212 of the UE may include suitable functions for sending a message to alert the eNodeB 112. Upon reception of the message from the UE 101, the Inter-RAT routine 412 of the eNodeB 112 may include suitable functions for completing the Inter-RAT handover.

In one example, the threshold may be about 500 Kbytes or other suitable values.

The period of time may be selected to be about 15 seconds or other suitable time periods. It should be noted that this is but one condition for triggering the Inter-RAT handover, and other suitable triggers may be used in other implementations. In various examples, in addition to downlink triggers, uplink traffic volume measurement (TVM) triggers may be used. In still other examples, a combination of downlink and uplink TVM triggers may be used.

In addition to data volume triggers, according to other aspects of the disclosure, other types of handover triggers may be used. For example, if the LTE coverage/quality is better than a certain threshold (e.g., based on compressed mode (CM) measurements or other implementation based techniques, such as estimated signal strength on collocated UMTS cell), Inter-RAT handover may be triggered to move the UE 101 from the UTRAN to the eUTRAN. For example, the signal quality may be an evolved UMTS terrestrial radio access (E-UTRA) reference signal receiver quality (RSRQ), an E-UTRA reference signal received power (RSRP), or a combination thereof At step 808, the UE 101 may revert to the UTRAN under certain conditions. For example, the eUTRAN coverage/quality may be below a certain threshold, the amount of data transferred by the UE 101 in a period of time is below a certain threshold, or other suitable conditions, triggers, or combinations thereof may be considered.

Thresholds such as those discussed above may be chosen to allow small web page and/or file downloads (e.g., social media updates, instant messaging (IM) sessions, mobile web pages downloads, etc.) to be handled by the UTRAN. The UE 101 may then be moved (handover) to the eUTRAN, for example, only for medium to large file downloads and heavy streaming (e.g., audio and/or video streaming)

However, pursuant to how current handover procedures are implemented in a communications system, when the UE 101 is moved from the UTRAN to the eUTRAN, or vice-versa, packets buffered at the RNC 104 in the UTRAN may be dropped if either (a) redirection is used or (b) Packet Switched Handover (PSHO) is used, and Inter-RAT data forwarding is not supported. This will lead to the TCP window being cut and can reduce the rate of growth of the TCP window in LTE. Therefore, performance degradation of the applications may be perceived by the user of the UE 101. In accordance with various aspects of the present disclosure, enhancements to the Inter-RAT handover (e.g., UTRAN to eUTRAN handover) are provided. These enhancements include UE-based and network-based techniques. Using UE-based techniques, "implementation specific" UE procedures may be used to (a) avoid packet drops at the RNC 104 or (b) allow packet drops at the RNC 104 but recover faster in the LTE side. Using network-based techniques, packet drops at the RNC 104 may be avoided through a change in mobility procedures. The following examples will provide a more detailed description of these techniques.

Figure 9:
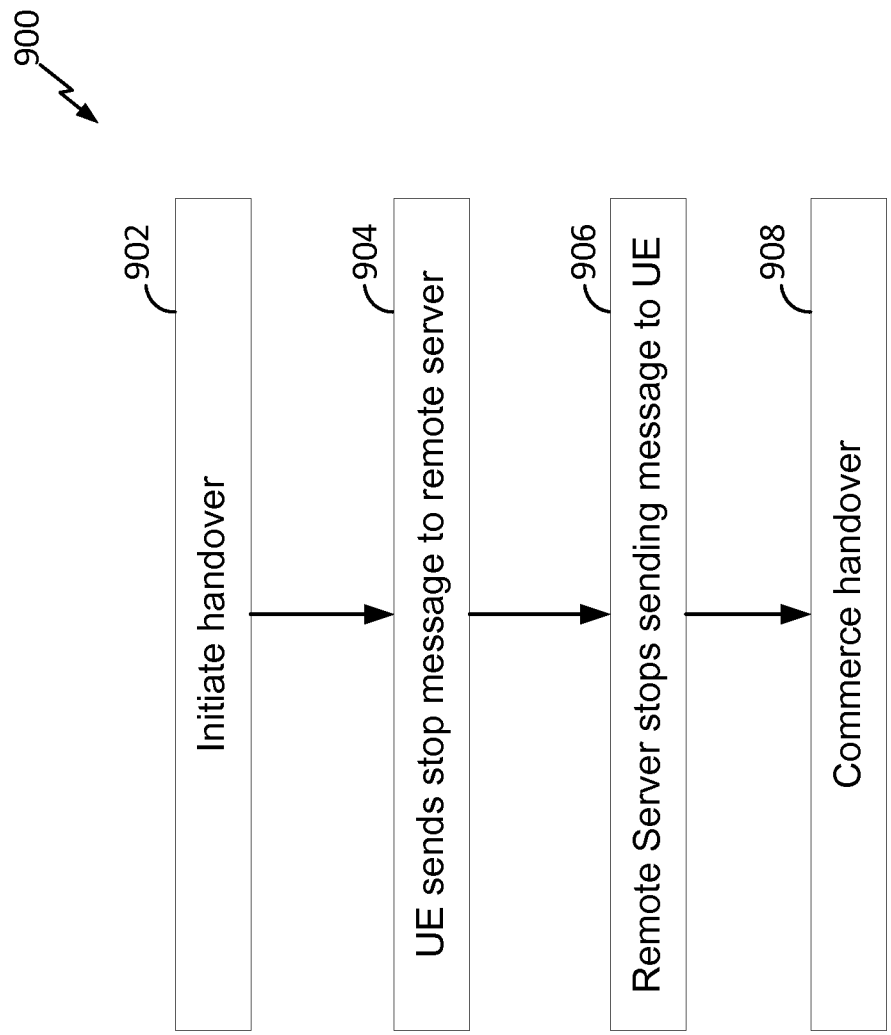
FIG. 9 is a flowchart illustrating procedures of moving an UE from a UTRAN to an eUTRAN while avoiding or reducing packets drop according to an example of the disclosure.

FIG. 9 is a flowchart 900 illustrating an exemplary procedure of moving the UE 101 from the UTRAN to the eUTRAN while avoiding or reducing packets drop. By way of example, the procedures illustrated with FIG. 9 may be implemented by the block 808 of FIG. 8. Referring to FIG. 9, in 902, an RNC 104 determines that the UE 101 is to be moved from UTRAN to eUTRAN based on one or more of the above-described trigger conditions or other suitable conditions. For example, the UE 101 is transferring data with a remote server 120 via HSPA. Then, in 904, the UE 101 sends a stop message to the remote server to request the remote server to stop sending data to the UE 101. In one aspect of the disclosure, the handover routine 212 of the UE 101 may include suitable functions for sending the stop message to the remote server 120. In one example, the UE 101 may be in data communication with a TCP server through the UTRAN, and the UE 101 may transmit a stop message (e.g., receive window size equal zero message hereafter "receive window=0") to the TCP server before commencing handover. In 906, responsive to the stop message, the remote server stops sending any more packets to the UE 101. In 908, handover may proceed to move the UE 101 from the UTRAN to the eUTRAN. For example, the routine 212 of the UE 101 may include suitable functions for carrying out the handover procedures.

However, there may be packets still in the data path because the remote server may have sent some more packets before the stop message is received. For example, some packets may be at the RNC 104 or other network nodes between the UE 101 and the remote server 120. Therefore, the stop message (e.g., "receive window=0") is sent sufficiently in advance by the UE 101. In some examples, an appropriate trigger may be used for sending the "receive window=0" message to the remote server 120 sufficiently in advance of the Inter-RAT handover. According to some aspects of the disclosure, suitable triggers may be mobility events in HSPA or LTE, or events leading to mobility events.

Figure 10:
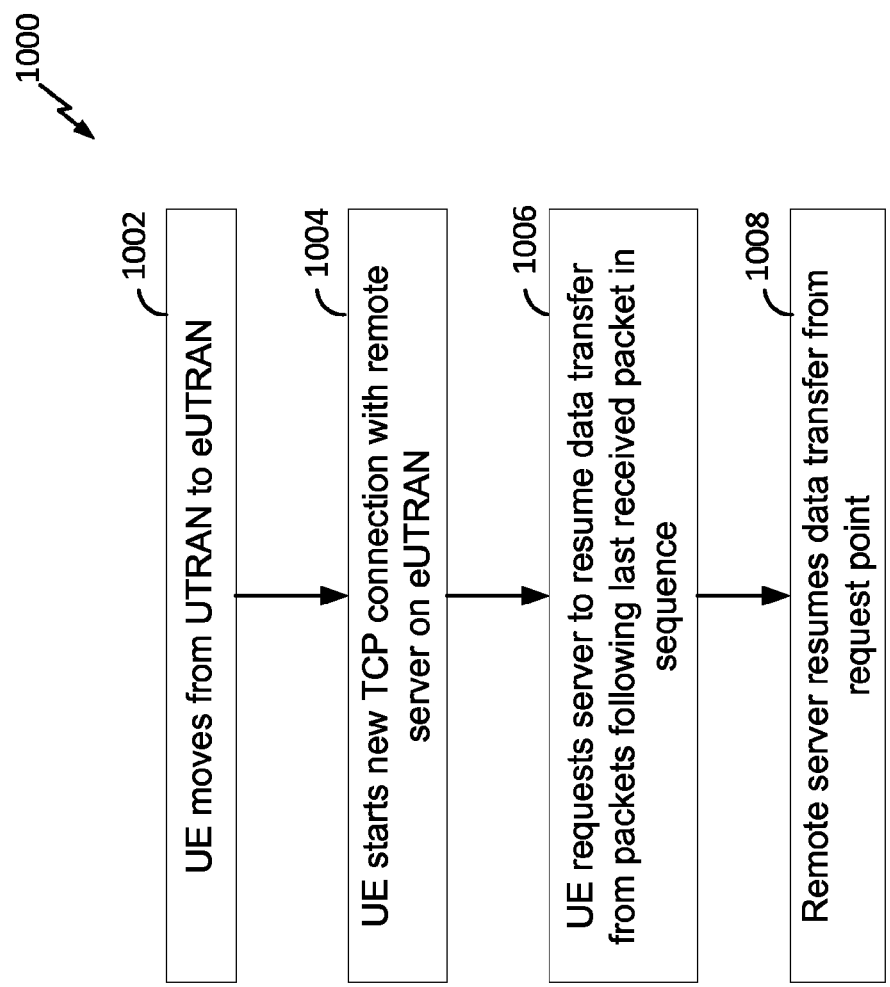
FIG. 10 is a flowchart illustrating procedures of fast recovery on the eUTRAN side after an Inter-RAT handover when packets are allowed to drop during the handover.

FIG. 10 is a flowchart 1000 illustrating the procedures of fast recovery on the eUTRAN side after an Inter-RAT handover when packets are allowed to drop during the handover. Different from the procedures of FIG. 9, the UE 101 may not send a stop message to a remote server before commencing handover. By way of example, the procedures illustrated in FIG. 10 may be implemented in the block 808 of FIG. 8. Referring to FIG. 10, in 1002, the UE 101 is to be moved from the UTRAN to the eUTRAN based on one or more of the above-described trigger conditions or other suitable conditions, for example, as set forth in reference to block 806. At this time, the UE 101 is transferring data with a remote server 120 via HSPA. Therefore, packets may be dropped at one or more of the network nodes when the UE 101 is moved from the UTRAN to the eUTRAN. In 1004, after the UE 101 is moved from the UTRAN to the eUTRAN (e.g., initiated by the RNC 104 executing the Inter-RAT routine 312 as set forth in reference to block 808), the UE 101 starts a new data connection (e.g., TCP connection) with the remote server 120 on the eUTRAN. Here, the handover of the UE 101 from the UTRAN to the eUTRAN can be accomplished by procedures generally known in the art.

In one example, the UE 101 may be configured to transfer files with the remote server 120 using a file transfer application (e.g., file transfer applications using the file transfer protocol (FTP)). Such file transfer application supports commands to retrieve only a part of the file. In 1006, by way of example, after the UE 101 started a new TCP connection with the remote server 120 on the eUTRAN, the UE 101 may request the remote server 120 to send data starting from the point the UE 101 has already downloaded on the previous TCP connection on HSPA before the handover. In 1008, the remote server 120 resumes data transfer starting from the requested point. When the technique illustrated in FIG. 10 are used for some or all of the commonly used applications (file transfer, streaming, etc.), it would likely cover a large percentage of cases, hence the handover performance may be enhanced. In some examples, this technique may involve some interaction with the UE's operating system (OS) or suitable modifications thereof.

Figure 11:
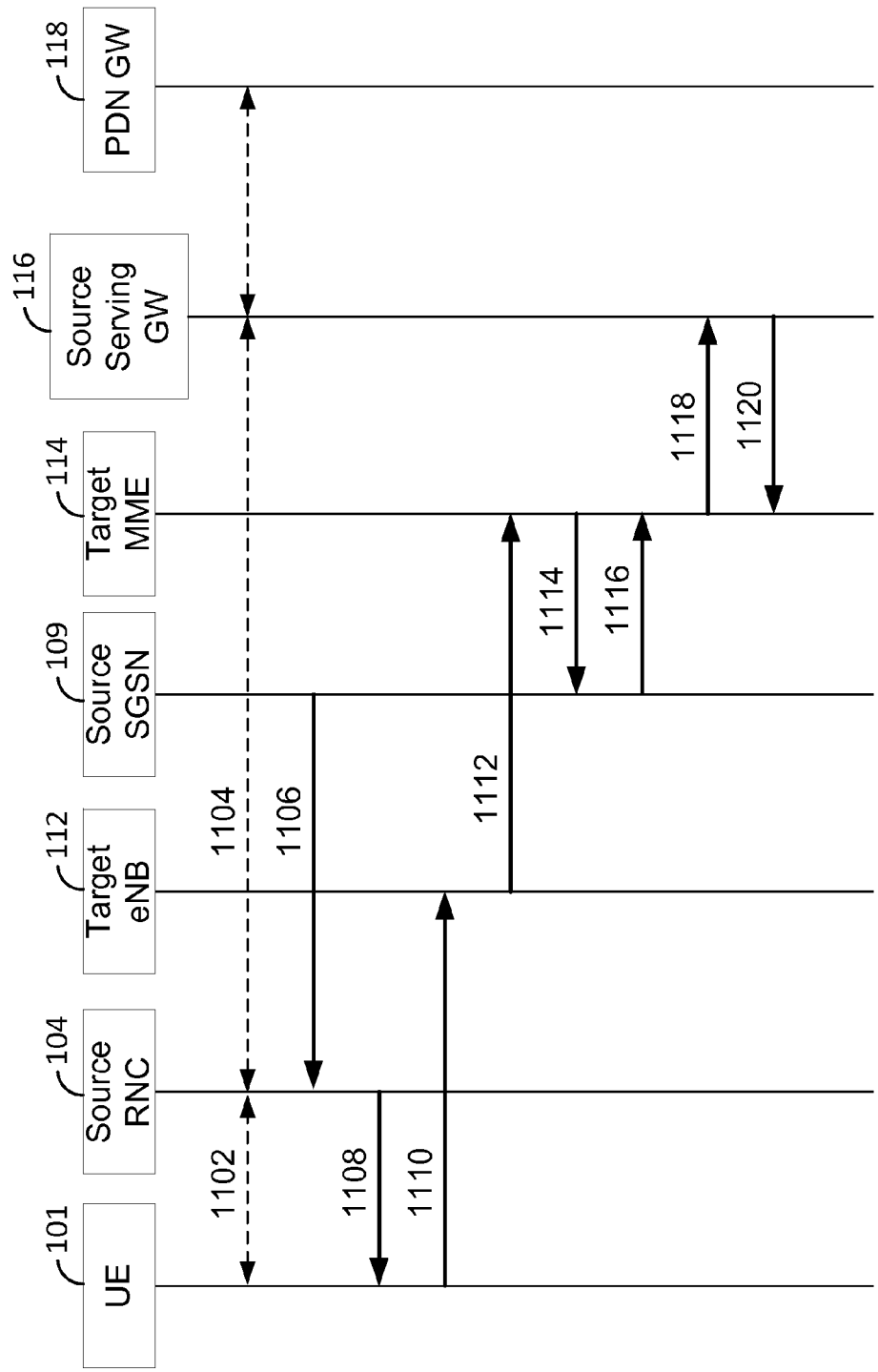
FIG. 11 is a diagram illustrating mobility procedures of moving a UE from a UTRAN to an eUTRAN according to the related art.

According to other aspects of the disclosure, the mobility procedures may be modified to avoid dropping packets at the RNC 104 during Inter-RAT handover. FIG. 11 is a diagram illustrating some mobility procedures of moving the UE 101 from the UTRAN to the eUTRAN according to the related art. For example, more detail of the procedures are defined in the 3GPP Technical Specification 23.401 V11.3.0 (2012-09), Release 11, Sections 5.5.2.2.2 to 5.5.2.2.3, which is hereby incorporated by reference in its entirety.

Referring to FIG. 11, a source RNC 104 decides to initiate an Inter-RAT handover from the UTRAN to the eUTRAN based on one or more of the trigger conditions described in reference to FIG. 8. At this point, both uplink and/or downlink user data may be transmitted via the following: bearer(s) 1102 between the UE 101 and the source RNC 104, GPRS tunneling protocol (GTP) tunnel(s) 1104 between the source RNC 104, the source SGSN 109, the serving gateway (S-GW) 116, and the PDSN gateway (P-GW) 118.

In a preparation phase, the source RNC 104 sends a Relocation Required message to the source SGSN 109 to request the core network to establish resources in a target eNB 112, a target MME 114, and the S-GW 116. During the preparation phrase, the source RNC 104 continues to receive downlink and/or uplink user plane PDUs. In an execution phase, the source SGSN 109 sends a message Relocation Command 1106 to the source RNC 104. The source RNC 104 will command to the UE 101 to handover to the target eNB 112 via the message HO from UTRAN Command 1108. The access network specific message to UE includes a transparent container including radio aspect parameters that the target eNB 112 has set-up in the preparation phase.

Upon the reception of the HO from UTRAN Command message 1108 containing the Relocation Command message, the UE 101 suspends the uplink transmission of the user plane data, and moves to the eUTRAN 110 and performs suitable access procedures toward the target eNB 112. When the UE 101 has gotten access to the target eNB 112, it sends the message HO to eUTRAN Complete 1110 to the target eNB 112. When the UE 101 has successfully accessed the target eNB 112, the target eNB 112 informs the target MME 114 by sending the message Handover Notify (TAI+ECGI) 1112. Then, the target MME 114 knows that the UE 101 has arrived at the target side, and the target MME 114 informs the source SGSN 109 by sending the Forward Relocation Complete Notification message 1114. The source SGSN 109 also sends an acknowledge message 1116 to the target MME 1114. The target MME 114 will now complete the Inter-RAT handover procedure by informing the S-GW 116 that the target MME 114 is now responsible for all the bearers the UE 101 have established. This is performed in the message Modify Bearer Request 1118.

The S-GW 116 acknowledges the user plane switch to the target MME 114 via the message Modify Bearer Response 1120. At this stage, the user plane path is established for all bearers between the UE 101, target eNB 112, S-GW 116, and P-GW 118. If the S-GW 116 does not change, the S-GW 116 shall send one or more "end marker" packets on the old path immediately after switching the path in order to assist the reordering function in the target eNB 112. The above-described handover procedures illustrate some of the relevant steps when a UE is moved from the UTRAN to the eUTRAN.

One skilled in the relevant art will understand that the handover procedures include other suitable steps or processes that are generally known in the art and are omitted for reasons of clarity and comprehensibility.

Figure 12:
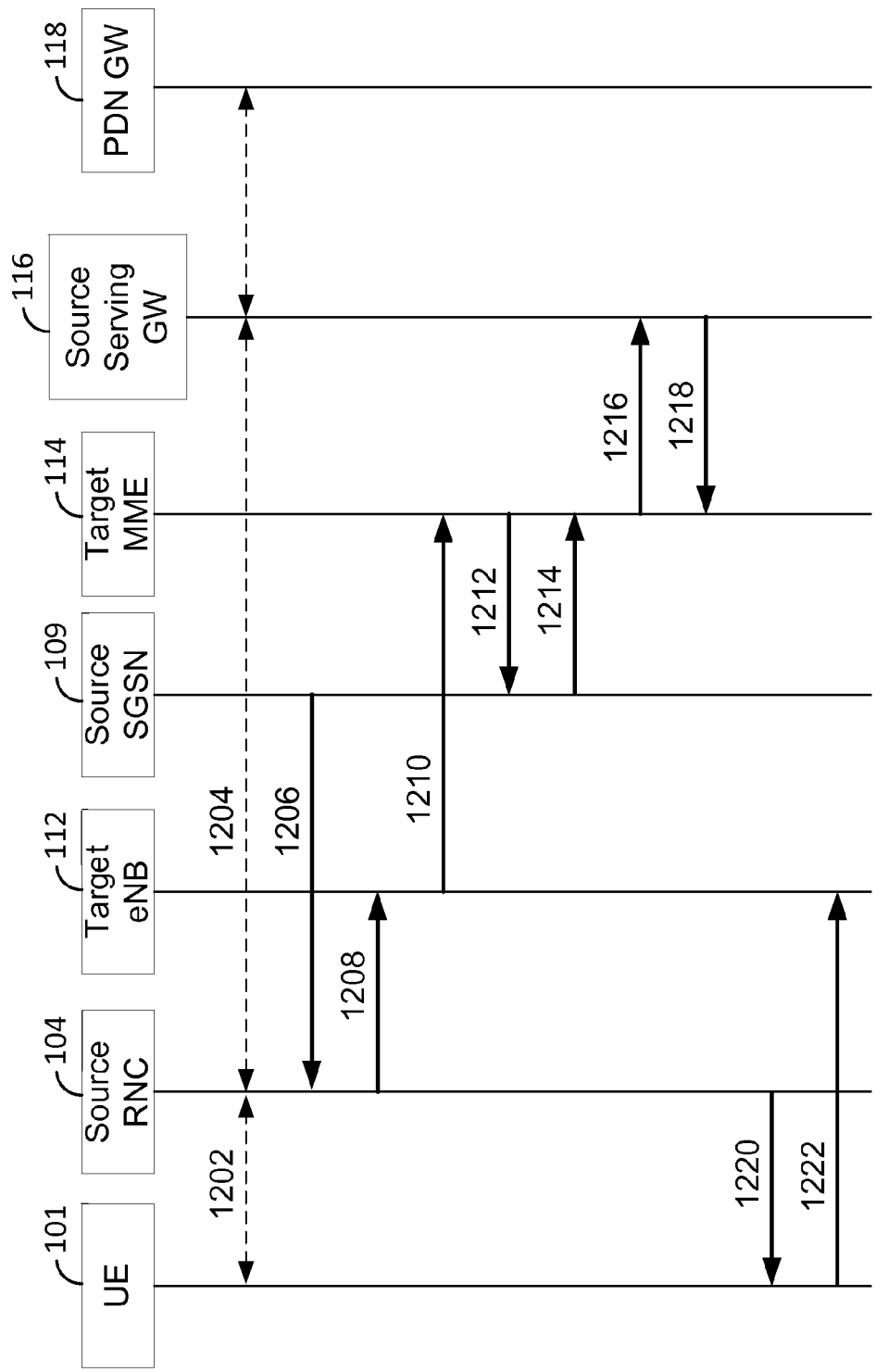
FIG. 12 is a diagram illustrating mobility procedures of moving a UE from a UTRAN to an eUTRAN according to an example of the present disclosure.

FIG. 12 is a diagram illustrating the mobility procedures of moving the UE 101 from the UTRAN to the eUTRAN according to some aspects of the present disclosure. However, the mobility procedures illustrated in FIG. 12 may be applicable in other Inter-RAT handovers. Referring to FIG. 12, a source RNC 104 decides to initiate an inter-RAT handover from the UTRAN to the eUTRAN based on one or more of the trigger conditions described in reference to FIG. 8. At this point, both uplink and/or downlink user data may be transmitted via the following: bearer(s) 1202 between the UE 101 and the source RNC 104, GPRS tunneling protocol (GTP) tunnel(s) 1204 between the source RNC 104, the source SGSN 109, the S-GW 116, and the P-GW 118.

In a preparation phase, the source RNC 104 sends a Relocation Required message to the source SGSN 109 to request the core network to establish resources in a target eNB 112, a target MME 114, and the S-GW 116. During the preparation phrase, the source RNC 104 continues to receive downlink and/or uplink user plane PDUs. In an execution phase, the source SGSN 109 may send the message Relocation Command 1206 to the source RNC 104. The source RNC 104 will command to the UE 101 to handover to the target eNB 112 via, for example, the message HO from UTRAN Command. However, before the source RNC 104 sends the message HO from UTRAN Command to the UE 101, the source RNC 104 waits for a suitable time period to clear buffers. In one example, the time period may be a few hundreds of millisecond. Different from the related art, the P-GW 118 may start forwarding packets to the eUTRAN before the UE 101 has been asked to handover from the UTRAN to the eUTRAN (i.e., before receiving the HO from UTRAN Command).

In one example, the source RNC 104 may send a suitable message (e.g., a pre-HO message) 1208 to the target eNB 112 via a suitable data connection. Responsive to the pre-HO message 1208, the target eNB 112 informs the target MME 114 by sending the message Handover Notify (TAI+ECGI) 1210. Then, the target MME 114 informs the source SGSN 109 by sending the Forward Relocation Complete Notification message 1212. The source SGSN 109 also sends an acknowledge message 1214 to the target MME 114. The target MME 114 will now commerce the Inter-RAT handover procedure by informing the S-GW 116 that the target MME 114 is now responsible for all the bearers the UE 101 have established. This is performed in the message Modify Bearer Request 1216.

The S-GW 116 acknowledges the user plane switch to the target MME 114 via the message Modify Bearer Response 1218. At this stage, the P-GW 118 may start forwarding packets to the eUTRAN side (e.g., eNB 112) before the UE 101 receives the message HO from UTRAN Command 1220 from the source RNC 104. Subsequently, when the UE 101 has access to the target eNB 112, the UE 101 sends the message HO to eUTRAN Complete 1222 to the target eNB 112. Accordingly, packet dropping may be avoided during the handover from the UTRAN to the eUTRAN because data can be sent using the eUTRAN before the UE 101 is moved from the UTRAN to the eUTRAN. The above-described handover procedures illustrate some of the relevant handover steps when the UE 101 is moved from the UTRAN to the eUTRAN according to some aspects of the disclosure. Other steps or processes that are generally known in the art are omitted for reasons of clarity and comprehensibility. Furthermore, the handover procedures illustrated in FIG. 12 may be applicable in other Inter-RAT handovers, and the present disclosure is not limited thereto.

The handover procedures illustrated in FIG. 12 calls for a change in the order of the message HO from UTRAN Command 1220 sent to the UE 101 and other messages for switching the user plane to the target eNB 112. Therefore, the user plane data connection may be switched from the source RNC 104 to the target eNB 112 earlier than that of the related art (e.g., FIG. 11). As those skilled in the art will readily appreciate, various aspects described throughout this disclosure may be extended to other telecommunication systems, network architectures and communication standards.

Several aspects of a wireless telecommunications system have been presented with reference to a UTRAN/eUTRAN system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   transferring data at a network controller for a user equipment via a first user plane connection in a first radio access network; and
   initiating a handover procedure of transferring the user equipment to a second user plane connection in a second radio access network,
   wherein the handover procedure comprises:
   transferring data for the user equipment via the second user plane connection before the user equipment receives a handover command; and
   relaying a request from the user equipment to an IP services server in data communication with the user equipment, to stop sending data to the user equipment via the first user plane connection.

2. The method of claim 1, wherein the request comprises a message corresponding to a receive window size.

3. The method of claim 2, wherein the receive window size is equal to zero.

4. The method of claim 1, wherein the first radio access network comprises a UMTS terrestrial radio access network (UTRAN).

5. The method of claim 4, wherein the second radio access network comprises an evolved UTRAN (E-UTRAN).

6. The method of claim 1, further comprising
   if an amount of the data transferred via the first user plane connection exceeds a first threshold value during a period of time, initiating the handover procedure.

7. The method of claim 1, further comprising:
   receiving at the network controller from the user equipment a signal quality indication of the second radio access network; and
   if the signal quality indication exceeds a second threshold value, initiating the handover procedure.

8. The method of claim 7, wherein the signal quality indication comprises an evolved UMTS terrestrial radio access (E-UTRA) reference signal receiver quality (RSRQ), an E-UTRA reference signal received power (RSRP), or a combination thereof.

9. An apparatus for wireless communication, comprising:
   means for transferring data for a user equipment via a first user plane connection in a first radio access network; and
   means for initiating a handover procedure of transferring the user equipment to a second user plane connection in a second radio access network,
   wherein the means for initiating the handover procedure comprises:
   means for transferring data for the user equipment via the second user plane connection before the user equipment receives a handover command; and
   means for relaying a request from the user equipment to an IP services server in data communication with the user equipment, to stop sending data to the user equipment via the first user plane connection.

10. A non-transitory computer-readable storage medium comprising code for causing a network controller to:
    transfer data for a user equipment via a first user plane connection in a first radio access network; and
    initiate a handover procedure of transferring the user equipment to a second user plane connection in a second radio access network,
    wherein in the handover procedure, the network controller is configured to:
    transfer data for the user equipment via the second user plane connection before the user equipment receives a handover command; and relay a request from the user equipment to an IP services server in data communication with the user equipment, to stop sending data to the user equipment via the first user plane connection.

11. An apparatus for wireless communication, comprising:
at least one processor; and
a memory coupled to the at least one processor,
wherein the at least one processor is configured to:
- transfer data for a user equipment via a first user plane connection in a first radio access network; and
- initiate a handover procedure of transferring the user equipment to a second user plane connection in a second radio access network,
- wherein in the handover procedure, the at least one processor is configured to:
  - transfer data for the user equipment via the second user plane connection before the user equipment receives a handover command; and
  - relay a request from the user equipment to an IP services server in data communication with the user equipment, to stop sending data to the user equipment via the first user plane connection.

12. The apparatus of claim 11, wherein the request comprises a message corresponding to a receive window size.

13. The apparatus of claim 12, wherein the receive window size is equal to zero.

14. The apparatus of claim 11, wherein the first radio access network comprises a UMTS terrestrial radio access network (UTRAN).

15. The apparatus of claim 14, wherein the second radio access network comprises an evolved UTRAN (E-UTRAN).

16. The apparatus of claim 11, wherein the at least one processor is further configured to
if an amount of the data transferred via the first user plane connection exceeds a first threshold value during a period of time, initiate the handover procedure.

17. The apparatus of claim 11, wherein the at least one processor is further configured to:
- receive from the user equipment a signal quality indication of the second radio access network; and
- if the signal quality indication exceeds a second threshold value, initiate the handover procedure.

18. The apparatus of claim 17, wherein the signal quality indication comprises an evolved UMTS terrestrial radio access (E-UTRA) reference signal receiver quality (RSRQ), an E-UTRA reference signal received power (RSRP), or a combination thereof.

19. A method of wireless communication, comprising:
transferring data at a network controller for a user equipment via a first user plane connection in a first radio access network; and
initiating a handover procedure of transferring the user equipment to a second user plane connection in a second radio access network,
wherein the handover procedure comprises:
- initiating the second user plane connection between the user equipment and an IP services server via the second radio access network before the user equipment receives a handover command; and
- transmitting a request to the IP services server to restart transmission of the data via the second user plane connection, starting with a packet following in sequence after a last packet received by the user equipment via the first user plane connection.

20. The method of claim 19, wherein the IP services server comprises a TCP server.

21. The method of claim 19, wherein the first radio access network comprises a UMTS terrestrial radio access network (UTRAN).

22. The method of claim 21, wherein the second radio access network comprises an evolved UTRAN (E-UTRAN).

23. The method of claim 19, further comprising
if an amount of the data transferred via the first user plane connection exceeds a first threshold value during a period of time, initiating the handover procedure.

24. The method of claim 19, further comprising:
receiving at the network controller from the user equipment a signal quality indication of the second radio access network; and
if the signal quality indication exceeds a second threshold value, initiating the handover procedure.

25. The method of claim 24, wherein the signal quality indication comprises an evolved UMTS terrestrial radio access (E-UTRA) reference signal receiver quality (RSRQ), an E-UTRA reference signal received power (RSRP), or a combination thereof.

26. An apparatus for wireless communication, comprising:
means for transferring data for a user equipment via a first user plane connection in a first radio access network; and
means for initiating a handover procedure of transferring the user equipment to a second user plane connection in a second radio access network,
wherein the means for initiating the handover procedure comprises:
- means for initiating the second user plane connection between the user equipment and an IP services server via the second radio access network before the user equipment receives a handover command; and
- means for transmitting a request to the IP services server to restart transmission of the data via the second user plane connection, starting with a packet following in sequence after a last packet received by the user equipment via the first user plane connection.

27. A non-transitory computer-readable storage medium comprising code for causing a network controller to:
transfer data for a user equipment via a first user plane connection in a first radio access network; and
initiate a handover procedure of transferring the user equipment to a second user plane connection in a second radio access network,
wherein in the handover procedure, the network controller is configured to:
- initiate the second user plane connection between the user equipment and an IP services server via the second radio access network before the user equipment receives a handover command; and
- transmit a request to the IP services server to restart transmission of the data via the second user plane connection, starting with a packet following in sequence after a last packet received by the user equipment via the first user plane connection.

28. An apparatus for wireless communication, comprising:
at least one processor; and
a memory coupled to the at least one processor,
wherein the at least one processor is configured to:
- transfer data for a user equipment via a first user plane connection in a first radio access network; and
- initiate a handover procedure of transferring the user equipment to a second user plane connection in a second radio access network,
- wherein in the handover procedure, the at least one processor is configured to:

initiate the second user plane connection between the user equipment and an IP services server via the second radio access network before the user equipment receives a handover command; and transmit a request to the IP services server to restart transmission of the data via the second user plane connection, starting with a packet following in sequence after a last packet received by the user equipment via the first user plane connection.

29. The apparatus of claim 28, wherein the IP services server comprises a TCP server.

30. The apparatus of claim 28, wherein the first radio access network comprises a UMTS terrestrial radio access network (UTRAN).

31. The apparatus of claim 30, wherein the second radio access network comprises an evolved UTRAN (E-UTRAN).

32. The apparatus of claim 28, wherein the at least one processor is further configured to
if an amount of the data transferred via the first user plane connection exceeds a first threshold value during a period of time, initiate the handover procedure.

33. The apparatus of claim 28, wherein the at least one processor is further configured to:
receive from the user equipment a signal quality indication of the second radio access network; and
if the signal quality indication exceeds a second threshold value, initiate the handover procedure.

34. The apparatus of claim 33, wherein the signal quality indication comprises an evolved UMTS terrestrial radio access (E-UTRA) reference signal receiver quality (RSRQ), an E-UTRA reference signal received power (RSRP), or a combination thereof.

* * * * *